Aug. 21, 1951  H. L. SPENCE  2,564,771
CUSHIONING MECHANISM
Filed May 9, 1947  2 Sheets-Sheet 1
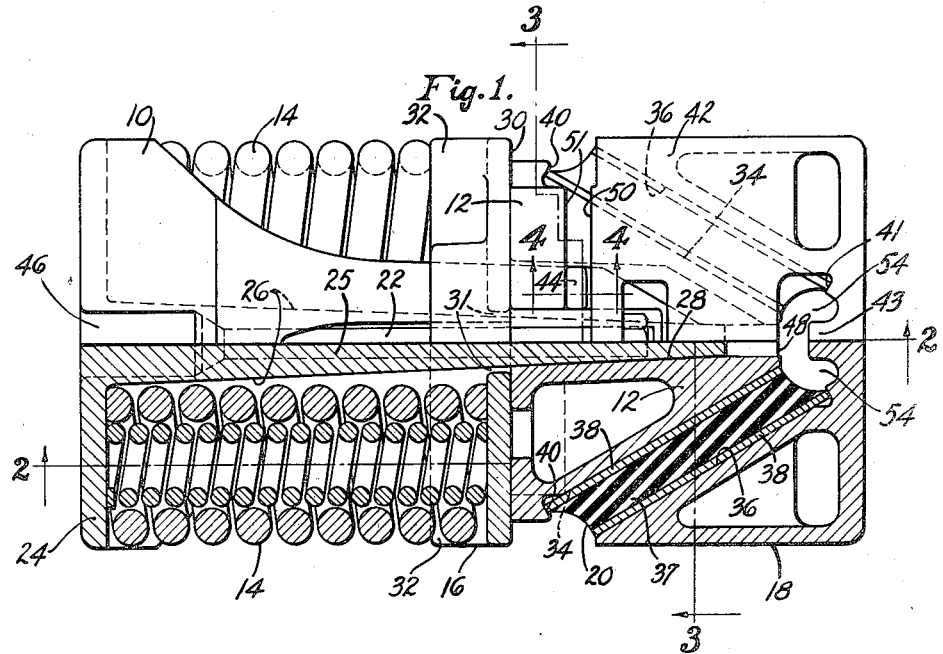
Fig. 1.
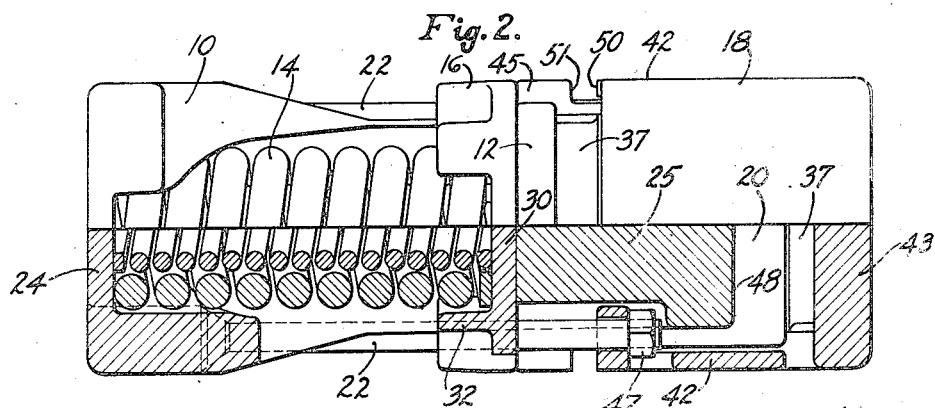
Fig. 2.
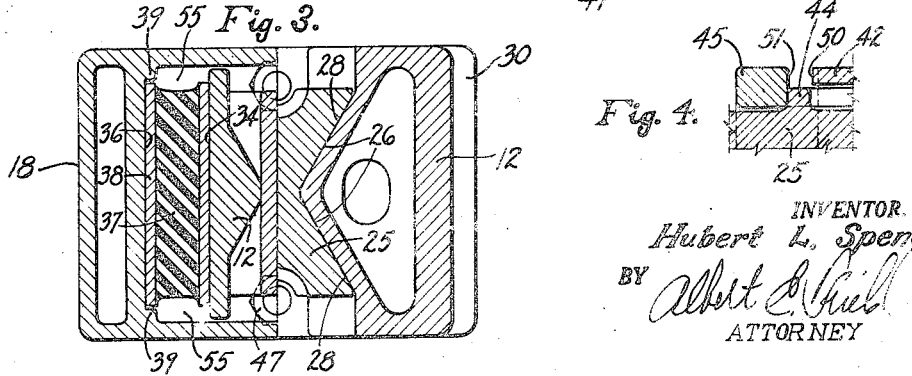
Fig. 3.
Fig. 4.
INVENTOR.
Hubert L. Spence
BY
ATTORNEY Aug. 21, 1951   H. L. SPENCE   2,564,771
CUSHIONING MECHANISM
Filed May 9, 1947   2 Sheets-Sheet 2
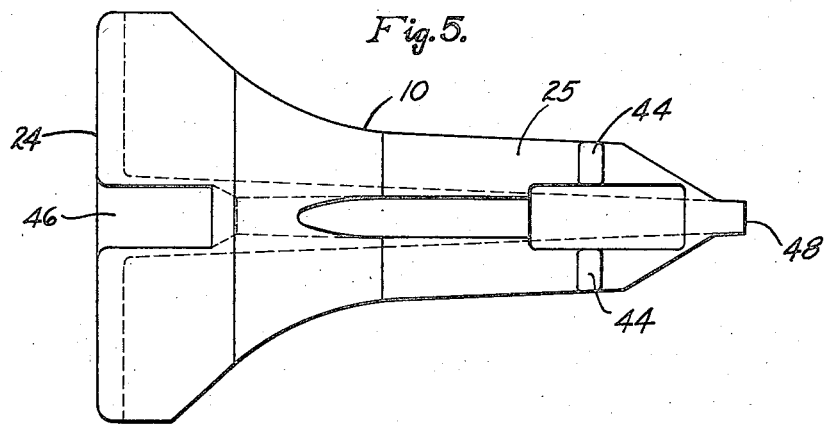
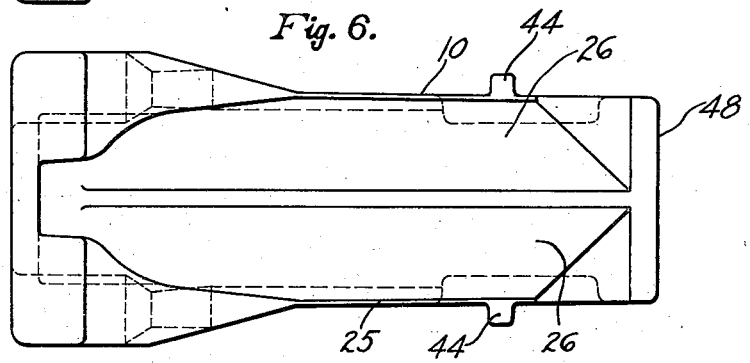
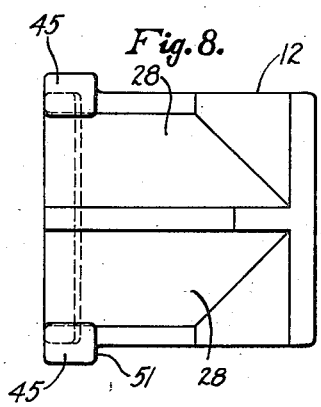
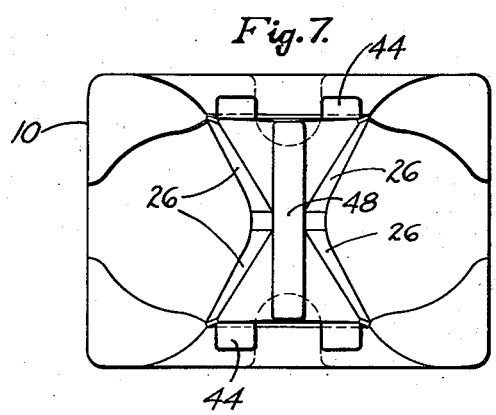
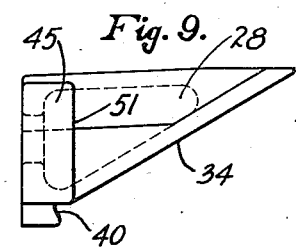
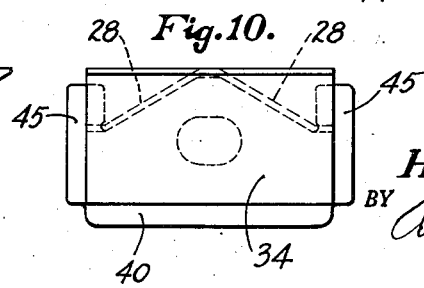
INVENTOR.
Hubert L. Spence
BY
ATTORNEY Patented Aug. 21, 1951

2,564,771

UNITED STATES PATENT OFFICE 2,564,771

CUSHIONING MECHANISM

Hubert L. Spence, East Cleveland, Ohio, assignor to National Malleable and Steel Castings Company, Cleveland, Ohio, a corporation of Ohio Application May 9, 1947, Serial No. 747,013

17 Claims. (Cl. 267—1)

This invention relates to cushioning mechanism particularly adaptable for use in railway vehicles.

An object of my invention is to provide a cushioning mechanism in which a portion of the resilient means thereof in addition to cushioning shocks also serves to actuate friction generating members of the mechanism.

Another object is to provide a cushioning mechanism in which soft initial action is provided, followed by the actuation of friction generating members to absorb heavy shocks.

A further object is to provide a cushioning mechanism in which rubber means is utilized to provide soft initial action and to actuate friction members during the remainder of the travel of the mechanism.

A still further object is to provide a cushioning mechanism in which wedge-shaped friction shoes are actuated by rubber means after a predetermined amount of compression of the rubber.

A more specific object is to provide a cushioning mechanism having a friction member, friction shoes slidably associated with the member, spring means for resisting relative movement between the member and shoes, a follower for actuating the shoes, and rubber means interposed between the follower and shoes adapted to urge the shoes laterally and longitudinally of friction member.

Other objects and advantages of my invention will be apparent from the following description taken in conjunction with the drawings in which:

Fig. 1 is a plan view partly in section of an embodiment of my invention.

Fig. 2 is an elevational view partly in section, taken along line 2—2 of Fig. 1.

Fig. 3 is a transverse sectional view taken along line 3—3 of Fig. 1.

Fig. 4 is a partial view taken along line 4—4 of Fig. 1.

Fig. 5 is a plan view of the friction member of the mechanism.

Fig. 6 is an elevational view of the friction member.

Fig. 7 is an end view of the friction member.

Fig. 8 is a plan view of one of the friction shoes of the mechanism.

Fig. 9 is an elevational view of the friction shoe.

Fig. 10 is an end view of the friction shoe.

My invention in its general arrangement comprises a friction member 10, wedge-shaped friction shoes 12 slidably associated with member 10, spring means 14 for opposing movement of shoes 12 relative to member 10, a seat member 16 interposed between shoes 12 and spring means 14, a follower member 18, resilient cushion units 20 interposed between the follower 18 and shoes 12, and tie bolts 22.

Friction member 10 is formed with a base or follower portion 24, which has a longitudinally extending friction portion 25. Portion 25 is preferably formed with two pairs of inwardly converging longitudinally extending friction surfaces 26. These surfaces diverge slightly in a direction toward base 24, as may be seen in Figs. 1 and 7, to increase the friction generated as shoes 12 move along portion 25, during actuation of the mechanism. Shoes 12 slidably engage surfaces 26 and are adapted to move lengthwise thereof against the resistance of spring means 14. The shoes are provided on their inner sides with pairs of friction surfaces 28 which are angularly disposed to correspond with surfaces 26. Spring means 14 preferably comprise two sets of inner and outer coil springs, each set being positioned adjacent friction portion 25 and in engagement with base 24. Engaging the other end of springs 14 is seat member 16 which has a flat base portion 30 for engagement with shoes 12. Portion 30 has a central opening 31 to permit the seat to move lengthwise of friction portion 25 during compression and release of the cushioning mechanism. Seat 16 also has peripheral flanges 32 which serve to strengthen the member and to maintain springs 14 in assembled relation. Each shoe 12 on its outer side is provided with a plane sloping surface 34 and with the two shoes in assembled relation, these surfaces are so disposed as to converge toward the end of the mechanism.

Follower 18 comprises a chambered portion having V-shaped walls 36 which correspond in slope with walls 34 of the shoes. Interposed between shoes 12 and follower 18 and in engagement with walls 34 and 36 thereof, respectively, are cushion units 20. The cushion units comprise a pad or block 37 of resilient material such as rubber with plates 38 vulcanized or otherwise bonded to the sides thereof. In order to prevent the cushioning units from sliding relative to shoes 12 or follower 18 during compression of the units, shoulders 40 and 41 on the shoes and follower, respectively, are provided for engagement with plates 38. Movement of the cushion units laterally of the mechanism is limited by shoulders 39 on follower 18 which are adapted to engage the adjacent plate 38. Tie walls 42 serve to reinforce follower 18 and prevent walls 36 from spreading when a compressive force is applied to the mechanism. An abutment 43 is provided on the follower and is adapted for engagement with end surface 48 of friction portion 25 to take the over-solid blows and limit the travel of the mechanism.

Springs 14 are held under initial compression by means of integral lugs 44 on friction portion 25 which engage stops 45 on shoes 12. It will be understood that the amount of initial compression of springs 14 may be varied by forming lugs 44 closer or farther from base 24 of the friction member. Follower 18 and cushion units 20 are held in assembled relation with the rest of the mechanism by means of tie bolts 22 which connect the follower to friction member 10. Base portion 24 of the friction member is recessed on each side thereof as at 46 to allow the bolts to slide during compression of the mechanism in service and in no way interfere with the operation. By means of nuts 47 the cushion units may be placed under the desired amount of initial compression. Movement of follower 18 relative to the shoes during compression of the mechanism is limited by the engagement of surfaces 50 of wall 42 with surface 51 on shoes 12, thereby precluding any damage to the cushion units by overloading them.

The operation of the mechanism is as follows:

Assuming for the purpose of illustration that base 24 is held stationary and a longitudinal force is applied to the end of follower 18, the initial movement thereof toward base 24 of the friction member is resisted by the cushioning units 20 which act in combined compression and shear, caused by the relative movement of plates 38 toward each other as well as in a lengthwise direction.

In order to provide room for the flow of the rubber as it is being compressed, spaces 54 extending laterally along the inner ends of blocks 37 and spaces 55 extending along the sides of the blocks are provided in follower 18. It will be observed that the sides and ends of the rubber have been undercut slightly to preserve the bond between the rubber and the plates when rubber is compressed and to allow greater space for expansion of the rubber within follower 18. As follower 18 continues its movement relative to the shoes it is resisted by the rubber until surfaces 50 have engaged surfaces 51 on the shoes, further compression and shear of the rubber being prevented to protect it from damage.

During the aforementioned movement of follower 18 relative to the shoes, the initial compression of springs 14 has been sufficient to maintain follower 16 as well as the shoes stationary. However, during the movement of follower 18 toward base 24, after engagement occurs between surfaces 50 and 51 further movement is resisted solely by springs 14 and the friction generated between shoes 12 and friction portion 25. Thus, light forces and shocks are absorbed by the rubber units while the heavier blows are resisted by the coil springs and frictional forces.

During the initial movement of follower 18 relative to shoes 12 cushion units 20 exert a lateral as well as longitudinal force against the shoes. Therefore the shoes are urged with increasing force into engagement with friction portion 25 during the initial movement of the follower. After surfaces 50 and 51 are in engagement and the shoes and follower begin to move together as a unit the frictional force between the shoes and portion 25, which has been built up to an appreciable amount, is immediately effective to oppose such further movement. In conjunction with springs 14 this frictional force very effectively cushions any heavy forces applied to the mechanism. As previously noted surface 26 has a slight taper in a longitudinal direction so that a greater amount of friction is generated between the shoes and portion 25 than would occur if this surface were not tapered. As the shoes are urged lengthwise of portion 25 toward base 24 they are also forced laterally outwardly a small amount due to the wedging action which occurs between surfaces 26 and 28. This outward movement occurs against the resistance of cushions 20 which have already been compressed a predetermined amount and against friction between the base of the shoes and base 30 of seat member 16, resulting in a considerable frictional force opposing further longitudinal movement of the shoes. This action continues throughout the travel of the shoes lengthwise of friction portion 25.

A feature of the operation of the mechanism, particularly when the device is used in conjunction with car couplers, resides in its ability to cushion the numerous light but intermittent shocks which occur while the train is in motion. The cushioning of such shocks is done by the rubber units which possess the resiliency necessary for this purpose. At the same time the device has the required capacity to cushion the heavy shocks applied thereto.

As described the operation of the mechanism is such that the preliminary travel is allowed only by the cushion units 20 thereof while the balance of the travel is through spring means 14. With this manner of operation the initial compression of springs 14 during assembly of the mechanism must be sufficient to permit units 20 to be compressed their predetermined amount before springs 14 begin to compress. However it is to be understood that the initial compression of springs 14 and the resiliency of units 20 may be varied to obtain various travel characteristics. For example, the initial compression of springs 14 could be such that shoes 12 would begin to move lengthwise of portion 25 at some point before surfaces 50 and 51 come into engagement as follower 18 compresses units 20 in its movement toward base 24, thus gradually blending the rubber resistance in with the coil spring resistance.

It is my purpose to provide substantial travel of the mechanism in its operation. To attain this purpose I intend that the rubber or whatever similar material is used in the cushion units be of substantial thickness so as to allow the rubber to cushion a considerable portion of the force applied to the mechanism. For instance, a rubber cushion as thick as 2" may be used and thereby allow as much as 1½" longitudinal travel between follower 18 and shoes 12 without overloading the rubber.

In assembling the mechanism the friction member 10 is placed in an upright position, resting on base 24. Then springs 14 are placed in position and seat member 16 is applied. Next the springs are compressed a sufficient amount by any suitable means applied to member 16 to provide sufficient clearance between base 30 and lugs 44 on friction portion 25 to enable shoes 12 to be slid laterally therebetween into position in engagement with portion 25. Springs 14 may then be allowed to expand until limited by the engagement between lugs 44 and surface 51 of the shoes. Thereafter cushion units 20 may be added and follower 18 placed in position on the units. The assembly is completed by the addition of tie bolts 22.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. A cushioning mechanism comprising a friction member having a follower portion and a longitudinally extending friction portion, spring means adjacent said friction portion and having one end thereof in engagement with said follower portion, a seat member engaging the other end of said spring means and movable lengthwise of said friction portion, friction shoes engaging said seat member and slidably engaging said friction portion, stop means on said friction portion adapted upon assembly of the mechanism to engage said shoes to maintain said spring means under predetermined compression, follower means having sloped surfaces facing similarly sloped surfaces on said shoes, and resilient pads interposed between said sloped surfaces on said shoes and follower means adapted to be compressed to allow relative movement between said follower means and said shoes and to urge said shoes against said friction portion.

2. In a cushioning mechanism a friction member, friction shoes engaging said member and being slidable lengthwise thereof, spring means reacting between said member and said shoes for opposing movement of said shoes relative to said member, a follower member associated with said shoes movable relative to said shoes and lengthwise of said friction member, said follower member being adapted to urge said shoes against said friction member and also to urge said shoes lengthwise thereof, resilient pads interposed between said shoes and follower member, and stop means on said friction member, shoes, and follower member, part of said means comprising tie walls on said follower member adapted to engage said shoes to limit movement of said follower toward said shoes when said mechanism is compressed and other of said means comprising an abutment on said follower member facing the end of said friction member and being adapted to engage therewith for limiting movement of said follower member toward said friction member.

3. In a cushioning mechanism a friction member comprising a base portion and a longitudinally extending friction portion, said friction member having V-shaped friction surfaces, friction shoes having complementary V-shaped surfaces in engagement with said surfaces on said member, said shoes being adapted for movement lengthwise of said member, spring means reacting between said base portion and said shoes for opposing movement of said shoes, a follower member for said shoes having a pair of wedging surfaces, said shoes having surfaces which correspond in slope with said wedging surfaces, and rubber pads interposed between said surfaces on said shoes and follower member to allow relative movement between said shoes and follower member, said rubber pads being adapted to urge said shoes longitudinally and laterally of said friction member in response to movement of said follower member toward said shoes.

4. In a cushioning mechanism a pair of spaced followers, one of said followers having a centrally disposed friction portion extending toward said other follower, friction shoes slidably associated with the outer sides of said portion, spring means interposed between said shoes and said first-named follower for resisting movement of said shoes toward said first-named follower, said shoes and said other follower having opposed correspondingly sloped wedging surfaces, and rubber means interposed between said wedging surfaces, said rubber means being adapted to resist movement of said other follower relative to said shoes and to exert a lateral force on said shoes.

5. A cushioning mechanism comprising a friction member having angularly disposed longitudinally extending friction surfaces, friction shoes having surfaces in engagement with said surfaces on said member and being adapted for movement lengthwise of said member, spring means reacting between said shoes and friction member for opposing said movement of said shoes, said shoes having wedging surfaces on the outer sides thereof, rubber pads engaging said wedging surfaces for urging said shoes into engagement with said friction member, and follower means having wedging surfaces corresponding in slope with said wedging surfaces on said shoes and engaging said rubber pads.

6. A cushioning mechanism comprising a pair of relatively movable end followers, one of said followers having a longitudinally extending friction portion, friction shoes slidably engaging said friction portion, spring means between said friction portion follower and said shoes for opposing movement of said shoes relative to said friction portion, said shoes having wedging surfaces on the outer sides thereof, said other follower having a recessed portion provided with wedging surfaces corresponding with wedging surfaces on said shoes, and rubber means within said recessed portion and interposed between said wedging surfaces on said shoes and follower, said rubber means upon relative movement of said followers toward each other being adapted to urge said shoes into engagement with said friction portion.

7. A cushioning mechanism comprising a pair of relatively movable end followers, one of said followers having a longitudinally extending friction portion, friction shoes engaging said friction portion and being movable lengthwise thereof, said shoes having wedging surfaces on the outer sides thereof, spring means reacting between said last mentioned follower and said shoes for opposing said movement of said shoes, rubber means having one side thereof in engagement with said wedging surfaces on said shoes, the other of said followers having corresponding wedging surfaces engaging the other side of said rubber means, said rubber means upon relative movement of said followers being adapted to urge said shoes longitudinally and laterally of said mechanism.

8. A cushioning mechanism comprising a friction member, friction shoes slidably associated with said member, spring means between said member and said shoes for opposing movement of said shoes along said member, said shoes being provided with sloping plane surfaces, follower means having plane surfaces sloped to correspond with said surfaces on said shoes, and rubber means interposed between said surfaces on said shoes and follower means, said rubber means being compressible to allow movement of said follower means toward said friction shoes and being adapted to press said shoes into engagement with said friction member.

9. A cushioning mechanism comprising a friction member, friction shoes slidably engaging said member, spring means reacting between said member and said shoes for opposing movement of said shoes along said member, said shoes having sloping plane surfaces which converge toward the end of the mechanism, a follower member having plane surfaces substantially parallel to said surfaces on said shoes and in opposed relation thereto, and rubber means interposed between said opposing surfaces on said shoes and follower member.

10. In a cushioning mechanism a friction member, friction shoes slidably associated with said member, spring means reacting between said member and said shoes for opposing movement of said shoes along said member, a follower member associated with said shoes, said shoes and follower having correspondingly sloped opposed wedging surfaces, rubber means interposed between said shoes and follower member and being in engagement with said surfaces, said rubber means being adapted to cushion movement of said follower lengthwise of said mechanism and to urge said shoes into engagement with said friction member, said follower member comprising spaced tie walls at the sides thereof adapted to engage said shoes to limit movement of said follower relative to said shoes.

11. In a cushioning mechanism a follower member having a pocket the walls of which are flared outwardly, resilient pads received in said pocket and having one side in engagement with said flared walls, wedge-shaped members in said pocket and engaging the other side of said pads, a friction member extending into said pocket and slidably engaging said shoes, and spring means between said friction member and said shoes, said friction member being movable in a lengthwise direction relative to said shoes and follower member against the resistance of said pads and said spring means.

12. A cushioning mechanism comprising a central longitudinally extending friction member, wedge members engaging said friction member and slidable lengthwise thereof, spring means reacting directly between said wedge members and one end of said friction member for opposing movement of said wedge members relative to said friction member, said wedge members having outer surfaces converging toward an end of said mechanism, a follower member having a pocket for receiving said wedge members, the walls of said pocket having corresponding converging plane surfaces spaced from the opposing surfaces on said wedge members, and resilient pads interposed between said opposing surfaces in said pocket and on said wedge members.

13. A cushioning mechanism comprising a central friction member, a wedge member engaging an outer side of said friction member and being movable in a direction longitudinally thereof, spring means reacting between said wedge member and said friction member for opposing said movement of said wedge member, a follower member associated with said wedge member, said follower member having a surface correspondingly sloped with a wedging surface on said wedge member, and rubber means interposed between said surfaces on said wedge member and said follower member and being adapted to urge said wedge member laterally against said friction member and also to cushion longitudinal movement of said follower relative to said shoe.

14. In a cushioning mechanism, a friction member, friction shoes slidably associated with said member, resilient means having its ends disposed between said shoes and an end of said friction member for opposing relative movement between said shoes and said member, and means for urging said shoes into frictional engagement with said member, said means comprising a follower member having a pair of V-shaped walls and rubber means interposed between said shoes and said walls.

15. In a cushioning mechanism a friction member, wedge-shaped members slidably associated with the outer sides of said member, spring means reacting between said wedge members and said friction member for opposing movement of said wedge members relative to said friction member, follower means having a pair of sloping surfaces facing similarly sloped surfaces on said wedge members, and rubber means interposed between said surfaces on said wedge members and said follower means, said rubber means being adapted to urge said members into engagement with said friction member upon movement of said follower means lengthwise of said friction member.

16. In a cushioning mechanism a friction member, spring means adjacent said member, friction shoes at one end of said spring means in engagement with said member, said spring means reacting between said shoes and an end of said member, said shoes being adapted to move relative to said member against the resistance of said spring means, said shoes having exterior surfaces converging outwardly, follower means associated with said shoes and member and having interior surfaces diverging outwardly so as to correspond in slope to said surfaces on said shoes, rubber means interposed between said correspondingly sloped surfaces on said shoes and follower and adapted to resist movement of said follower relative to said shoes and to exert a lateral force against said shoes to urge them into increasing engagement with said member.

17. A cushioning mechanism comprising a friction member, a friction shoe engaging said member and being movable lengthwise thereof, spring means having its ends reacting between an end of said friction member and said shoe, said shoe having a wedge face, a resilient pad having one side thereof in engagement with said face and follower means having a wedge face engaging the other side of said pad and being adapted to subject said pad to combined compression and shear upon longitudinal movement of said wedge means relative to said shoe.

HUBERT L. SPENCE.

REFERENCES CITED

The following references are of record in the file of this patent:

UNITED STATES PATENTS

| Number | Name | Date |
|---|---|---|
| 1,707,490 | O'Connor | Apr. 2, 1929 |
| 1,713,914 | O'Connor | May 21, 1929 |
| 1,872,978 | Krakau | Aug. 23, 1932 |
| 1,956,108 | Symington et al. | Apr. 24, 1934 |
| 2,079,088 | Spence | May 4, 1937 |
| 2,211,463 | Hobson | Aug. 13, 1940 |
| 2,295,556 | Flesch | Sept. 15, 1942 |
| 2,336,969 | Tack | Dec. 14, 1943 |
| 2,352,030 | Sproul | June 20, 1944 |